(12) United States Patent
Kostka et al.

(10) Patent No.: US 10,244,348 B2
(45) Date of Patent: Mar. 26, 2019

(54) METHODS FOR AUTHENTICATING COMMUNICATION BETWEEN A MOBILE DEVICE AND WIRELESS BEACON AT A REMOTE DOMAIN NAME SYSTEM, PROJECTING A LEVEL OF INTEREST IN A NEARBY PRODUCT, AND PROVIDING AND ORDERING OPTION OR PRODUCT DATA

(71) Applicant: Estimote, Inc., Walnut, CA (US)

(72) Inventors: Lukasz Kostka, Walnut, CA (US); Jakub Krzych, Walnut, CA (US)

(73) Assignee: Estimote Polska Sp z o.o., Cracow (PL)

( * ) Notice: Subject to any disclaimer, the term of this patent is extended or adjusted under 35 U.S.C. 154(b) by 874 days.

(21) Appl. No.: 14/463,597

(22) Filed: Aug. 19, 2014

(65) Prior Publication Data
US 2015/0081474 A1    Mar. 19, 2015

Related U.S. Application Data

(60) Provisional application No. 61/867,493, filed on Aug. 19, 2013, provisional application No. 61/867,498, filed on Aug. 19, 2013.

(51) Int. Cl.
*H04W 4/02* (2018.01)
*H04W 4/21* (2018.01)
(Continued)

(52) U.S. Cl.
CPC ........ *H04W 4/021* (2013.01); *G06Q 30/0261* (2013.01); *G06Q 30/0267* (2013.01);
(Continued)

(58) Field of Classification Search
CPC ........... G06Q 30/0601–30/0645; G06Q 30/08; G06Q 30/0261; G06Q 30/0267;
(Continued)

(56) References Cited

U.S. PATENT DOCUMENTS

| 6,091,358 A | 7/2000 | Maniscalco et al. |
| 7,027,808 B2 | 4/2006 | Wesby |

(Continued)

FOREIGN PATENT DOCUMENTS

| WO | 21429 | 3/2002 |
| WO | 021429 | 3/2003 |

(Continued)

OTHER PUBLICATIONS

Burnside, Matt, et al. "Proxy-based security protocols in networked mobile devices." Proceedings of the 2002 ACM symposium on Applied computing. ACM, 2002. (Year: 2002).*

*Primary Examiner* — Marissa Thein
*Assistant Examiner* — Michelle T Kringen
(74) *Attorney, Agent, or Firm* — Jeffrey Schox; Diana Lin

(57) ABSTRACT

One variation of a method for distributing notifications to a mobile computing device, includes: receiving a unique identifier broadcast wirelessly from a wireless beacon arranged within a physical space; receiving authorization to communicate with the wireless beacon based on the unique identifier; identifying a product arranged within the physical space proximal the wireless beacon; projecting a level of interest in the product by a user affiliated with the mobile computing device based on communication between the mobile computing device and the wireless beacon during a period of time; and in response to the level of interest in the product exceeding a threshold value, presenting, on the mobile computing device, a product ordering option for ordering a unit of the product.

20 Claims, 6 Drawing Sheets

(51) Int. Cl.
| | |
|---|---|
| *H04W 4/30* | (2018.01) |
| *H04W 4/80* | (2018.01) |
| *G06Q 30/02* | (2012.01) |
| *G06Q 30/06* | (2012.01) |
| *H04W 12/06* | (2009.01) |
| *H04W 4/021* | (2018.01) |
| *H04W 76/11* | (2018.01) |
| *H04W 88/08* | (2009.01) |
| *G06Q 30/00* | (2012.01) |
| *H04W 4/12* | (2009.01) |
| *H04W 4/04* | (2009.01) |

(52) U.S. Cl.
CPC ..... *G06Q 30/0633* (2013.01); *G06Q 30/0639* (2013.01); *G06Q 30/0641* (2013.01); *H04W 4/02* (2013.01); *H04W 4/04* (2013.01); *H04W 4/12* (2013.01); *H04W 4/21* (2018.02); *H04W 4/30* (2018.02); *H04W 12/06* (2013.01); *H04W 76/11* (2018.02); *H04W 88/08* (2013.01); *G06Q 30/0281* (2013.01); *H04W 4/80* (2018.02)

(58) Field of Classification Search
CPC .... G06Q 30/0281; H04W 4/021; H04W 4/02; H04W 4/04; H04W 4/12; H04W 4/206; H04W 4/008; H04W 12/06; H04W 76/021; H04W 88/08
USPC ...................... 705/26.1–27.2, 26.8
See application file for complete search history.

(56) References Cited

U.S. PATENT DOCUMENTS

| | | | |
|---|---|---|---|
| 7,038,584 B2 | 5/2006 | Carter | |
| 7,072,671 B2 | 7/2006 | Leitch | |
| 7,146,178 B2 * | 12/2006 | Lehikoinen | G06Q 30/0241 455/456.1 |
| 7,283,846 B2 | 10/2007 | Spriestersbach et al. | |
| 7,312,752 B2 | 12/2007 | Smith et al. | |
| 7,458,825 B2 | 12/2008 | Atsmon et al. | |
| 7,499,462 B2 | 3/2009 | MacMullan et al. | |
| 7,639,131 B2 | 12/2009 | Mock et al. | |
| 7,705,728 B2 | 4/2010 | Mock et al. | |
| 7,835,505 B2 | 11/2010 | Toyama et al. | |
| 7,855,679 B1 | 12/2010 | Braiman | |
| 8,058,988 B1 | 11/2011 | Medina et al. | |
| 8,139,945 B1 | 3/2012 | Amir et al. | |
| 8,260,320 B2 | 9/2012 | Herz | |
| 8,265,621 B2 | 9/2012 | Kopikare et al. | |
| 8,407,417 B2 | 3/2013 | Matsuda et al. | |
| 8,489,112 B2 | 7/2013 | Roeding et al. | |
| 8,594,850 B1 | 11/2013 | Gourlay et al. | |
| 8,612,604 B2 | 12/2013 | Beatty et al. | |
| 8,644,255 B1 | 2/2014 | Burcham et al. | |
| 8,694,060 B2 | 4/2014 | Vanderaa et al. | |
| 8,694,782 B2 | 4/2014 | Lambert | |
| 8,723,720 B2 | 5/2014 | Moffatt et al. | |
| 8,781,502 B1 | 7/2014 | Middleton et al. | |
| 8,797,214 B2 | 8/2014 | Taylor et al. | |
| 8,844,007 B2 | 9/2014 | Vicente et al. | |
| 8,847,754 B2 | 9/2014 | Buchheim et al. | |
| 8,867,993 B1 | 10/2014 | Perkins et al. | |
| 8,868,133 B1 | 10/2014 | Rosenbaum et al. | |
| 8,886,230 B2 | 11/2014 | Sydir et al. | |
| 8,938,196 B2 | 1/2015 | Bradish et al. | |
| 8,988,221 B2 | 3/2015 | Raji et al. | |
| 9,014,715 B2 | 4/2015 | Alizadeh-Shabdiz et al. | |
| 9,033,255 B2 | 5/2015 | Tessier et al. | |
| 9,036,792 B2 | 5/2015 | Cacioppo et al. | |
| 9,063,212 B2 | 6/2015 | Jones, Jr. | |
| 9,113,309 B2 | 8/2015 | Uilecan et al. | |
| 9,154,565 B2 | 10/2015 | Monighetti | |
| 9,202,245 B2 | 12/2015 | Kostka et al. | |
| 9,282,582 B1 | 3/2016 | Dunsbergen et al. | |
| 9,351,114 B2 | 5/2016 | Chatterjee et al. | |
| 9,361,630 B1 | 6/2016 | Goswami | |
| 9,398,422 B2 | 7/2016 | Zampini, II | |
| 9,408,060 B2 | 8/2016 | Helms et al. | |
| 9,424,699 B2 | 8/2016 | Kusens et al. | |
| 9,445,305 B2 | 9/2016 | Lyon et al. | |
| 9,462,469 B2 * | 10/2016 | Hillyard | G06F 8/654 |
| 9,471,917 B2 | 10/2016 | Govindarajan et al. | |
| 9,474,962 B2 | 10/2016 | Barney et al. | |
| 9,491,575 B2 | 11/2016 | Edge et al. | |
| 9,544,744 B2 | 1/2017 | Postrel | |
| 9,558,507 B2 | 1/2017 | Zilkha | |
| 9,571,957 B2 | 2/2017 | Granbery | |
| 9,591,570 B2 | 3/2017 | Kubo et al. | |
| 9,621,446 B2 | 4/2017 | Pugh et al. | |
| 9,622,046 B2 | 4/2017 | Otis et al. | |
| 9,622,208 B2 | 4/2017 | Mycek et al. | |
| 9,629,064 B2 | 4/2017 | Graves et al. | |
| 9,642,173 B2 | 5/2017 | Granbery | |
| 9,652,124 B2 | 5/2017 | Cotier et al. | |
| 9,689,955 B2 | 6/2017 | Rosenbaum | |
| 9,712,967 B2 | 7/2017 | Kostka et al. | |
| 9,826,356 B2 | 11/2017 | Mycek et al. | |
| 9,843,591 B2 * | 12/2017 | Bliss | H04L 63/105 |
| 9,866,996 B1 | 1/2018 | Krzych et al. | |
| 9,867,009 B2 | 1/2018 | Mycek et al. | |
| 2002/0167919 A1 * | 11/2002 | Marples | H04W 64/00 370/328 |
| 2002/0176388 A1 * | 11/2002 | Rankin | G08G 1/0962 370/338 |
| 2003/0100315 A1 | 5/2003 | Rankin | |
| 2003/0146835 A1 | 8/2003 | Carter | |
| 2006/0163349 A1 | 7/2006 | Neugebauer | |
| 2006/0290519 A1 | 12/2006 | Boate et al. | |
| 2008/0068519 A1 | 3/2008 | Adler et al. | |
| 2008/0139306 A1 | 6/2008 | Lutnick et al. | |
| 2009/0005079 A1 | 1/2009 | Shields et al. | |
| 2009/0131079 A1 | 5/2009 | Sekhar | |
| 2009/0327135 A1 | 12/2009 | Nguyen et al. | |
| 2010/0019924 A1 | 1/2010 | D Alessandro et al. | |
| 2010/0093374 A1 | 4/2010 | DaCosta | |
| 2010/0317371 A1 | 12/2010 | Westerinen et al. | |
| 2011/0029359 A1 * | 2/2011 | Roeding | G06Q 30/00 705/14.1 |
| 2011/0238188 A1 | 9/2011 | Washiro | |
| 2011/0305228 A1 | 12/2011 | Cordeiro | |
| 2012/0095805 A1 | 4/2012 | Ghosh et al. | |
| 2012/0172055 A1 | 7/2012 | Edge | |
| 2012/0190386 A1 | 7/2012 | Anderson | |
| 2012/0262365 A1 | 10/2012 | Mallinson | |
| 2012/0309256 A1 | 12/2012 | Theodore | |
| 2012/0316960 A1 | 12/2012 | Yang | |
| 2013/0023282 A1 | 1/2013 | Lin et al. | |
| 2013/0030915 A1 * | 1/2013 | Statler | G06Q 30/06 705/14.54 |
| 2013/0063303 A1 | 3/2013 | Zhou | |
| 2013/0182625 A1 | 7/2013 | Kuehnel et al. | |
| 2013/0184002 A1 | 7/2013 | Moshfeghi | |
| 2013/0203445 A1 * | 8/2013 | Grainger | G01S 5/0257 455/456.3 |
| 2013/0225197 A1 | 8/2013 | McGregor et al. | |
| 2013/0288668 A1 * | 10/2013 | Pragada | H04W 12/06 455/426.1 |
| 2013/0295879 A1 * | 11/2013 | Mahalingam | H04W 12/08 455/410 |
| 2013/0337771 A1 | 12/2013 | Klein et al. | |
| 2014/0087758 A1 | 3/2014 | Maor | |
| 2014/0122855 A1 | 5/2014 | Maneval | |
| 2014/0148196 A1 | 5/2014 | Bassan-Eskenazi et al. | |
| 2014/0220883 A1 | 8/2014 | Emigh et al. | |
| 2014/0277654 A1 | 9/2014 | Reinhardt et al. | |
| 2015/0005011 A1 | 1/2015 | Nehrenz et al. | |
| 2015/0031388 A1 | 1/2015 | Chatterjee et al. | |
| 2015/0079942 A1 | 3/2015 | Kostka et al. | |
| 2015/0081474 A1 | 3/2015 | Kostka et al. | |
| 2015/0106196 A1 | 4/2015 | Williams et al. | |
| 2015/0163828 A1 | 6/2015 | Vandwalle et al. | |
| 2015/0245305 A1 | 8/2015 | Camps Mur | |

(56) References Cited

U.S. PATENT DOCUMENTS

| | | | |
|---|---|---|---|
| 2015/0276432 A1 | 10/2015 | Repyevsky et al. |
| 2015/0279115 A1 | 10/2015 | Vukicevic |
| 2015/0296048 A1 | 10/2015 | Gerding et al. |
| 2015/0296333 A1 | 10/2015 | Chen |
| 2015/0334548 A1 | 11/2015 | Liu et al. |
| 2015/0351008 A1 | 12/2015 | Mayor |
| 2016/0014609 A1 | 1/2016 | Goel et al. |
| 2016/0063550 A1 | 3/2016 | Caldwell |
| 2016/0086460 A1 | 3/2016 | King et al. |
| 2016/0094598 A1 | 3/2016 | Gedikian |
| 2016/0099758 A1 | 4/2016 | Bell et al. |
| 2016/0188919 A1 | 6/2016 | Gao et al. |
| 2016/0192407 A1 | 6/2016 | Fyfe et al. |
| 2016/0291127 A1 | 10/2016 | Huang et al. |
| 2017/0019765 A1 | 1/2017 | Hoyer et al. |
| 2017/0079001 A1 | 3/2017 | Lewis |

FOREIGN PATENT DOCUMENTS

| | | |
|---|---|---|
| WO | 043388 | 3/2016 |
| WO | 040690 | 3/2017 |

\* cited by examiner

METHODS FOR AUTHENTICATING COMMUNICATION BETWEEN A MOBILE DEVICE AND WIRELESS BEACON AT A REMOTE DOMAIN NAME SYSTEM, PROJECTING A LEVEL OF INTEREST IN A NEARBY PRODUCT, AND PROVIDING AND ORDERING OPTION OR PRODUCT DATA

CROSS-REFERENCE TO RELATED APPLICATIONS

This invention claims the benefit of U.S. Provisional Application No. 61/867,493, filed on Aug. 19, 2013 and to U.S. Provisional Application No. 61/867,498, filed on Aug. 19, 2013, which are both incorporated in their entireties by this reference.

TECHNICAL FIELD

This invention relates generally to the field of wireless communication, and more specifically to a new and useful method for distributing notifications in the field of wireless communication.

DESCRIPTION OF THE EMBODIMENTS

The following description of the embodiments of the invention is not intended to limit the invention to these embodiments, but rather to enable any person skilled in the art to make and use this invention.

1. Method

Figure 1:
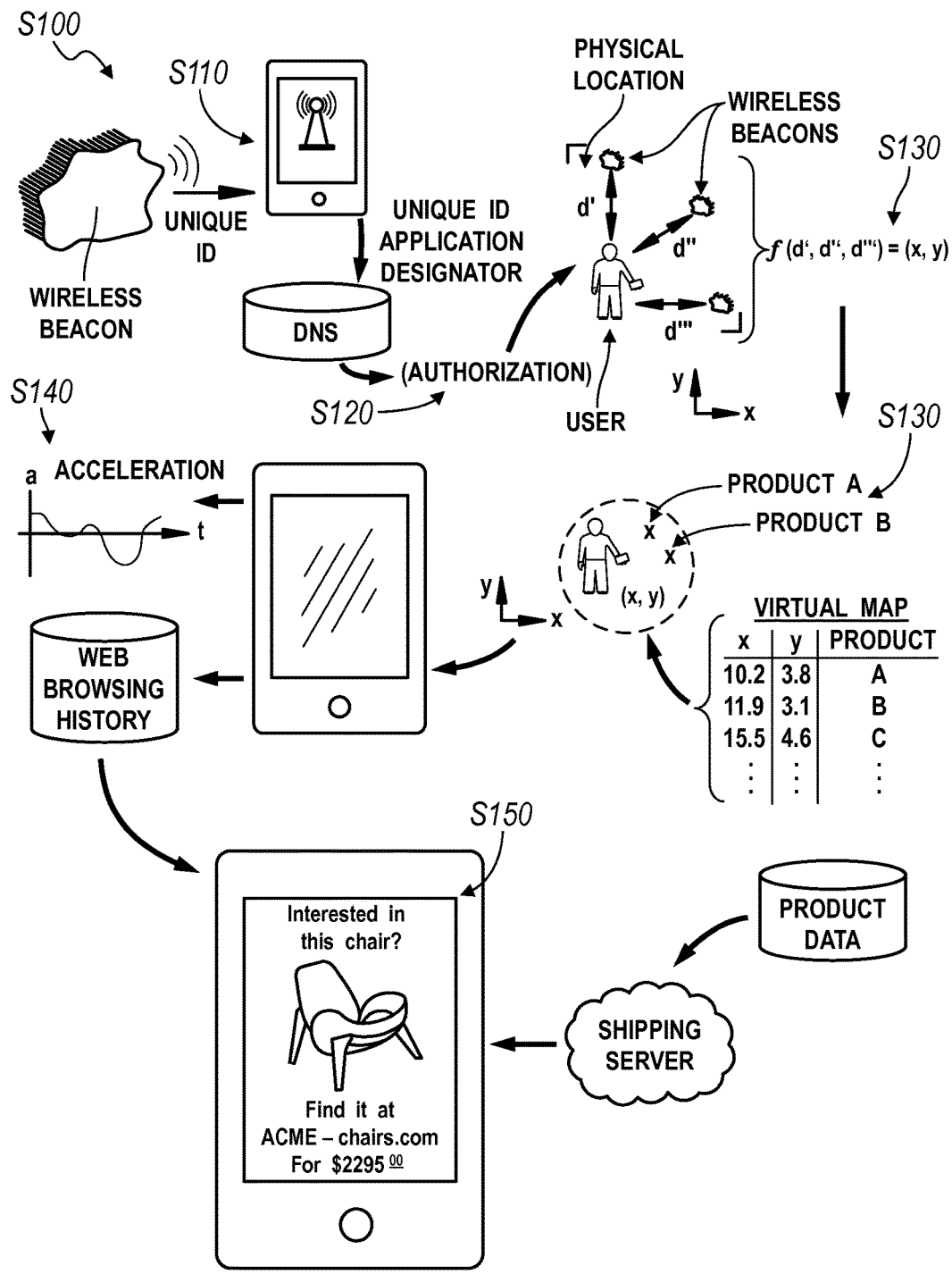
FIG. 1 is a flowchart representation of a method of the invention.

As shown in FIG. 1, a method for distributing notifications to a mobile computing device, including: receiving a unique identifier broadcast wirelessly from a wireless beacon arranged within a physical space in Block S110; receiving authorization to communicate with the wireless beacon based on the unique identifier in Block S120; identifying a product arranged within the physical space proximal the wireless beacon in Block S130; projecting a level of interest in the product by a user affiliated with the mobile computing device based on communication between the mobile computing device and the wireless beacon during a period of time in Block S140; and in response to the level of interest in the product exceeding a threshold value, presenting, on the mobile computing device, a product ordering option for ordering a unit of the product in Block S150.

Figure 3:
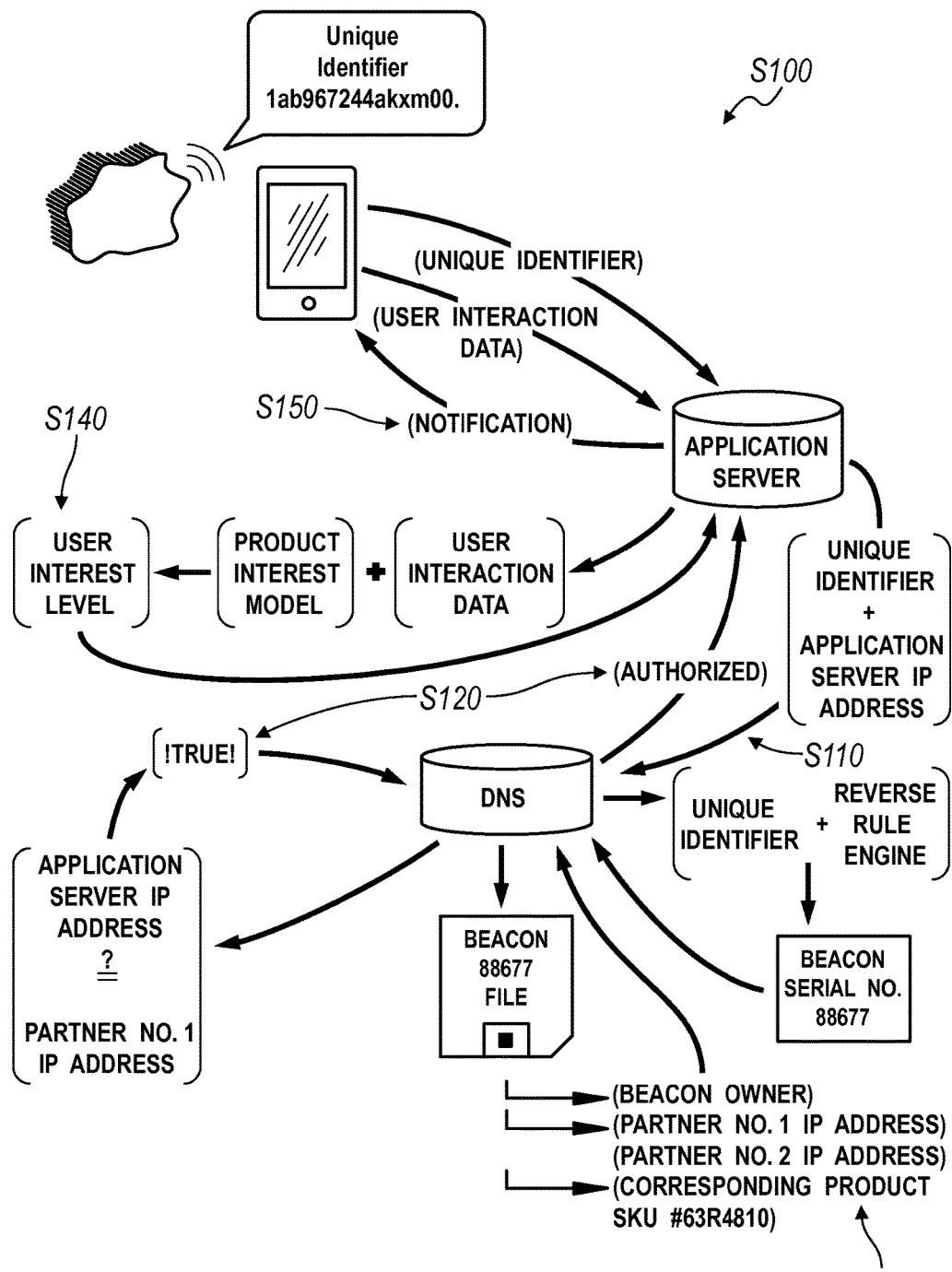
FIG. 3 is a flowchart representation of one variation of the method.

As shown in FIG. 3, one variation of the method includes: receiving a unique identifier from the mobile computing device, the unique identifier broadcast wirelessly from a wireless beacon arranged within a physical space in Block S110; identifying the wireless beacon based on the unique identifier in Block S120; identifying a product arranged within the physical space proximal the mobile computing device based on a known location of the wireless beacon within the physical space in Block S130; projecting a level of interest in the product by a user affiliated with the mobile computing device based on communication between the mobile computing device and the wireless beacon during a period of time in Block S140; and in response to the level of interest in the product exceeding a threshold value, transmitting product data corresponding to the product to the mobile computing device for presentation to the user in Block S150.

2. Applications

The method functions to deliver product-related data to a user through the user's mobile computing device based on a proximity of the mobile computing device to a corresponding local wireless beacon and based on a perceived interest of the user in the product. The method can deliver product information and/or a product purchase option directly to the user through the user's mobile computing device (e.g., smartphone, tablet, personal data assistant (PDA), smartwatch) substantially in real-time when the user is near the product and/or is interacting with the product, thereby enriching the user's review of the product and/or enabling the user to complete a spontaneous purchase of a unit of the product. The method can additionally or alternatively deliver product-related data to the user through his mobile computing device when the user moves away from the product or leaves the physical location occupied by the product, such as by queuing presentation of these data on the mobile computing device based on perceived levels of user interest in various products within the store to prompt the user to order one or more items of greatest perceived interest to the user. The method can thus enable a consumer-facing physical location housing floors samples of products to function solely as a showroom for these products by enabling customers to seamlessly place orders for new units of these products through their mobile computing devices, these units thus delivered to these customers from a secondary inventory location, such as an inventory location distinct and remote (e.g., in a another city or state) the storefront. The method can thus reduce or eliminate inventory space requirements, inventory management, payment and return handling, and other tangible-product-related burdens of sales through brick-and-mortar storefronts by dissociating physical product review by customers (e.g., at a brick-and-mortar storefront) and sale of physical product to customers (e.g., remotely by large remote inventory and shipping location).

The method can be implemented as a native application executing on a mobile computing device: to characterize a user's interest a particular product (such as based on an estimated proximity of the user's mobile computing device to a wireless beacon corresponding to the particular product); to collect user-product interaction data while the user's mobile computing device is near the product; and to deliver targeted information pertaining to the product to the user through the user's mobile computing device. For example, wireless beacons can be arranged throughout a storefront, such as near an entrance to the storefront, over racks or shelves containing products, and/or directly on products for sale or show within the storefront. In this example, the mobile computing device can communicate with the various wireless beacons while the user moves throughout the storefront, and Blocks of the method can: confirm access to data from the wireless beacons based on unique identifiers received therefrom; track the user's movement throughout the storefront based on proximity of the user to the various wireless beacons; characterize the user's proximity and interactions with products within the storefront (e.g., based on the additional data received from the wireless beacons); and then deliver product purchase options and/or other product data to the user via the user's mobile computing device according to perceived interest of the user in particular products, such as once the user leaves the storefront as shown in FIG. 2.

By automatically delivering product purchase notifications to the user directly on the user's mobile computing device, the method can thus enable the user to (substantially seamlessly) order a unit of a product with which he recently or is currently interacting. For example, the method can prompt the storefront to set aside a unit of a product ordered by the user responsive to selection of a purchase option presented to the user on the user's mobile computing device such that the unit of the product is (already paid for and) ready for pickup by the user when the user is ready to leave the storefront. In another example, the method can prompt an inventory location affiliated with the storefront (or product showroom) to ship a unit of a product ordered by the user responsive to selection of a purchase option presented to the user on the user's mobile computing device, thereby enabling the user to purchase a unit of the product and to leave the storefront without the unit of product in tow and without checking out at a physical kiosk within the storefront.

Figure 2:
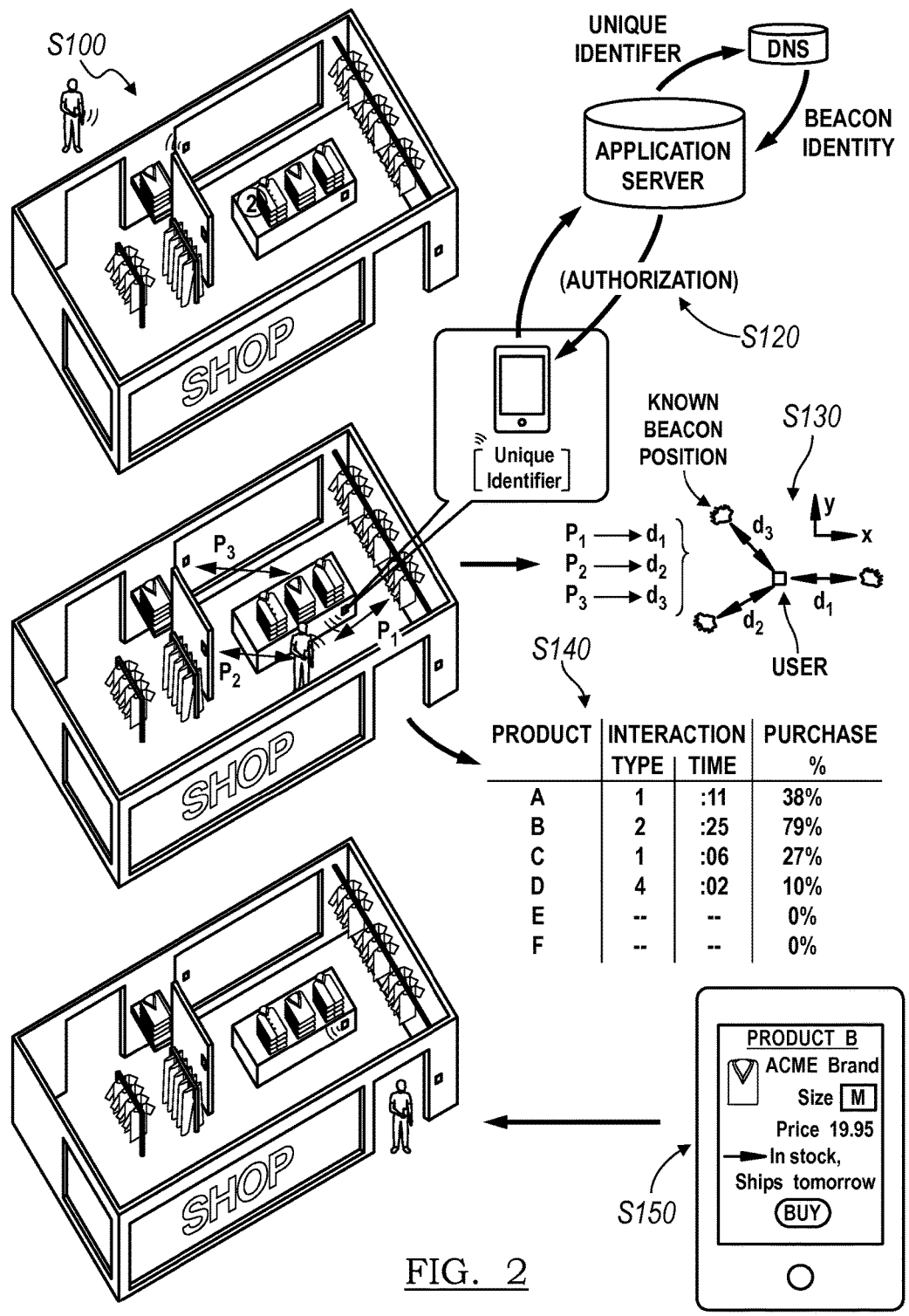
FIG. 2 is a flowchart representation of one variation of the method.

Blocks of the method can additionally or alternatively be executed by a computer system remote from the user's mobile computing device, such as by a domain name system (DNS) hosted on a remote server or by an application server hosted on a remote server, as shown in FIGS. 2 and 3. The computer system can be cloud-based (e.g., Amazon EC2), a mainframe computer system, a grid-computer system, or any other suitable computer system. As described above, Blocks of the method can also execute locally on a user's mobile computing device, such as within a native application executing on the user's smartphone, tablet, a personal music player, a PDA, a smartwatch, or other mobile computing device. For example, Blocks of the method can be implemented by a smartphone executing a native retailer- or service provider-branded application handling real-time delivery of communications to a user responsive to receipt of unique identifiers from local wireless beacons.

Figure 4:
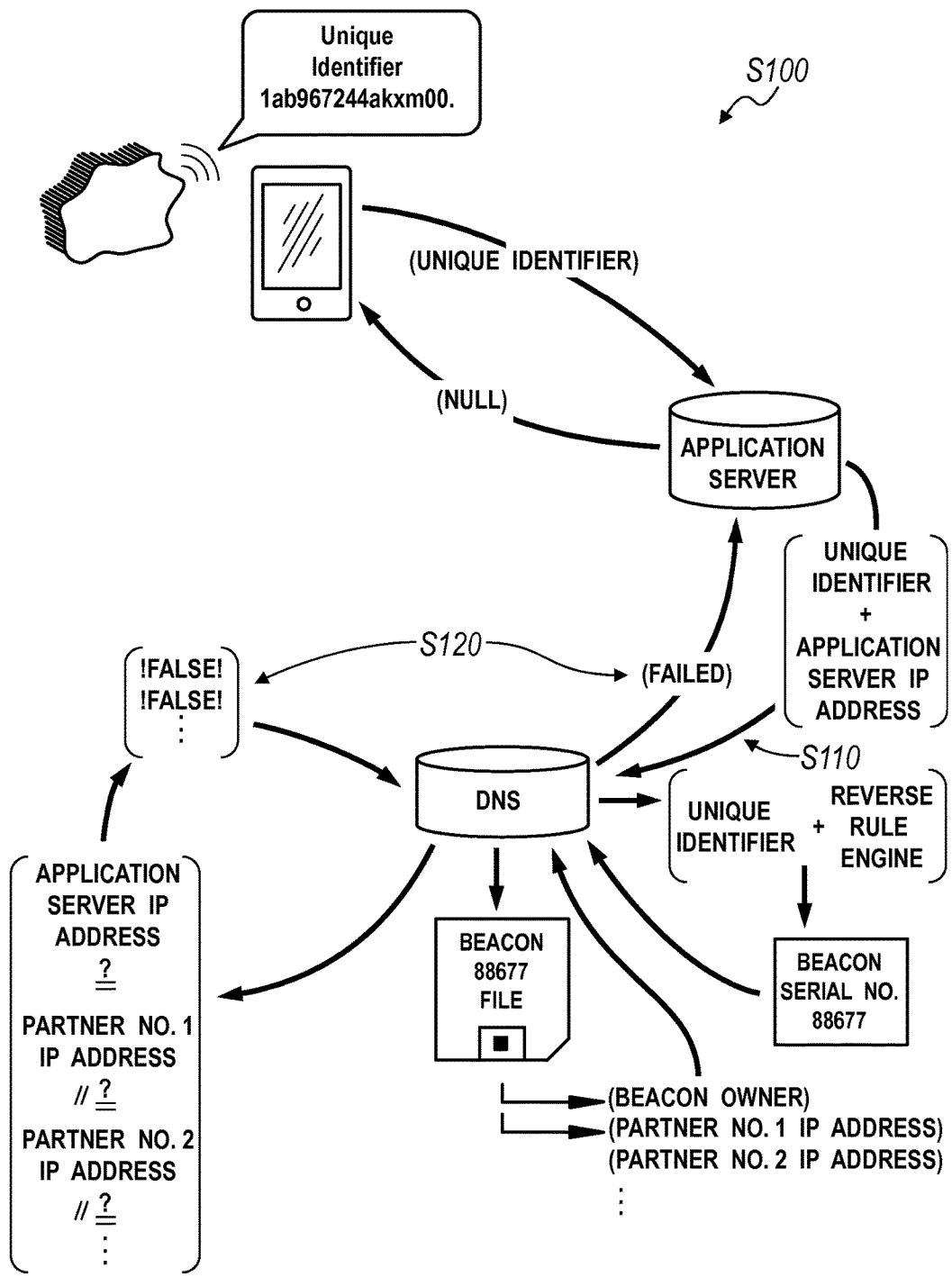
FIG. 4 is a flowchart representation of one variation of the method.

The method further selectively authorizes notifications to the user's mobile computing device in response to proximity of the user' mobile computing device to one or more wireless beacons, as shown in FIGS. 3 and 4. In particular, the method can restrict delivery of product-related notifications—through the user's mobile computing device—originating from any other than the physical location (e.g., store) occupied by the wireless beacon or an entity associated with the physical location and/or the wireless beacon. In one example, a particular retail location sells various products that are also available from other establishments and online. A group of wireless beacons purchased by the particular retail location are installed throughout the particular retail location, and assignments to the particular retail location are stored for the group, such as on a remote database and based on unique serial numbers assigned to each wireless beacon in the group. In this example, when a user enters the particular retail location, the method can limit communications—to (or through) the mobile computing device and triggered by proximity of the mobile computing device to wireless beacons in the group—to only those originating from a remote server (e.g., an application server) and/or a native application (executing on the user's mobile computing device) that is/are affiliated with the particular retail location and/or a product sold by the particular retail location. In particular, the method can prevent a competitor to the particular retail location from distributing competitive communications to the user through the user's mobile computing device responsive to proximity of the user's mobile computing device to wireless beacons owned by the particular retail location, as shown in FIG. 4. Similarly, the method can prevent a manufacturer of a product competing with a particular product within the store location from delivering competing product data to the user's mobile computing device when the user's mobile computing device is near the particular product. The method can implement this functionality by: passing a unique identifier (e.g., a universally unique identifier (or "UUID"))—received from a wearable device—into a DNS to identify the wireless beacon (e.g., a serial number of the wireless beacon); accessing a limited set of (e.g., one or more) parties with permission to deliver communications to mobile computing devices responsive to communication with the wireless beacon; and enabling presentation of beacon-related communications through the native application executing on the mobile computing device substantially only given a suitable match between an identifier of the native application (or a related application server) and an entity in the set of parties corresponding to the wireless beacon.

The method can therefore function: to collect user/product interaction data based from communications between a user's mobile computing device and one or more wireless beacons within a showroom, retail, customer service, product interaction, or other space; and to deliver timely, product-related or product-specific notifications to the user through the user's mobile computing device.

3. Wireless Beacon

The wireless beacon can include a water- and/or dust-resistant cover or housing, a battery, a wireless communication module, one or more sensors (e.g., an accelerometer, a gyroscope, a temperature sensor, a compass, etc.), and an adhesive backing that transiently or intransiently attaches the wireless beacon to a surface, such as a wall or shelving unit within a store location. For example, the wireless beacon can be placed (i.e., statically arranged) within a showroom or other retail setting such that, when a user enters the showroom with his mobile computing device executing a native shopping application related to the retail setting, the mobile computing device and the wireless beacon can communication wirelessly to deliver micro-location-, product-, and/or user-specific data, deals, notifications, etc. to the user. In another example, multiple wireless beacons can be placed throughout an isle within a furniture showroom such that when the user—with his mobile computing device—visits the storefront, the mobile computing device communicates with the wireless beacons and executes Blocks of the method to track the user's position within the storefront over time, to correlate the user's positions with particular décor items within the storefront, and to then present information related to the décor item(s) to the user through the mobile computing device. In this example, the method can deliver such product-related information to the user's mobile computing device once the user leaves the storefront, such as based on a ranked or scored user interest in various products within the storefront such as determined from types, characteristics, and/or lengths of user interactions with the various décor items during the user's visit to the showroom.

The wireless beacon can additionally or alternatively be configured to coupled directly to a corresponding product.

For example, components of the wireless beacon can be packaged within a sticker that can be applied to a single unit of product. In another example, components of the wireless beacon can be packaged within a (larger) waterproof housing that mounts to a floor sample vehicle at a car dealership.

The wireless beacon can locally store and (intermittently) recall a rule to locally generate a unique identifier that is not immediately resolvable into a useful value without access to the rule, and the wireless beacon can then publically broadcast this unique identifier for collection by any local computing device. For example, the wireless beacon can broadcast a universally unique identifier ("UUID"), such as including a string of characters (e.g., a 128-bt hexadecimal number) in which the string of characters is practically unique (i.e., not guaranteed unique). The wireless beacon can also pass its own serial number (stored locally in memory), a unique identifier request counter value, an interval counter value, a time of day, a date, and/or any other static value or variable value into the rule to generate the unique identifier that is practically unique among substantially all other unique identifiers broadcast from all other deployed wireless beacons over time.

In one example, the rule for generating the unique identifier is encoded onto the wireless beacon during its manufacture, upon purchase by an entity (e.g., the second entity), or upon deployment of the wireless beacon into a space, etc. The wireless beacon can then implement the rule to generate new unique identifiers over time during its deployment. For example, the wireless beacon can: index a request counter in response to receipt of a new request for a unique identifier received from a local computing device; apply the state of the request counter and an internal serial number to the rule to generate a new unique identifier responsive to the request; and broadcast the unique identifier with the state of the request counter for collection by the computing device accordingly. In this example, Block S110 (executed locally on the computing device or remotely) can then pass the request counter value and the unique identifier into a reverse rule engine (to which access is limited, such as only to a privately-controlled DNS) to resolve the unique identifier into the serial number of the wireless beacon in Block S120.

Alternatively, the wireless beacon can systematically generate a new unique identifier for each subsequent time interval during its deployment, such as by generating a new unique identifier every five minutes during its deployment. For example, the wireless beacon can: maintain an internal interval counter and index the interval counter forward every minute; apply the new interval counter value to generate a new unique identifier for the current time interval; and publically broadcast this new unique identifier for collection by a local computing device. As in the previous example, Block S110 can pass the interval counter value and the unique identifier into a reverse rule engine to resolve the unique identifier into a serial number of the wireless beacon.

However, the wireless beacon can apply a time of day corresponding to generation of the unique identifier (a "time code"), a date of generation of the unique identifier (a "date code"), a time or date of receipt of the unique identifier at the computing device, and/or any other trackable variable to the rule to generate the unique identifier, and Block S120 can extract this variable from a data packet—including the unique identifier—received from the wireless beacon in Block S110 to resolve the unique identifier into an identity of the wireless beacon.

As described above, the wireless beacon can also include various other sensors, such as a (multi-axis) accelerometer, a gyroscope, a temperature sensor, and/or a compass or magnetic sensor, etc. and can wireless broadcast these data to a local mobile computing device, such as once the mobile computing device and the wireless beacon have paired following identification of the wireless beacon and authorization of communications between the mobile computing device and the wireless beacon. For example, the wireless beacon can sample one or more internal sensors (e.g., at a rate of 10 Hz) once the wireless beacon wirelessly pairs with a local computing device, and the wearable device can broadcast raw or filtered sensor data to the computing device for only as long as the wireless beacon and the computing device are wirelessly paired.

4. Unique Identifier

Block S110 of the method recites receiving a unique identifier broadcast wirelessly from a wireless beacon arranged within a physical space. (Block S110 can similarly recite receiving a unique identifier from the mobile computing device, the unique identifier broadcast wirelessly from a wireless beacon arranged within a physical space.) Generally, Block S110 functions to initiate communication between the wireless beacon and the user's mobile computing device by receiving a unique identifier broadcast from the wireless beacon, such as by broadcasting a beacon identifier request and receiving a unique identifier transmitted from the wireless beacon responsive to the beacon identifier request. Block S110 can then distribute the unique identifier to a database to identify the wireless beacon, and Block S120 can receive authorization to communicate with the wireless beacon accordingly.

In one implementation, the wireless communication module within the wireless beacon includes a Bluetooth transceiver that transmits a unique identifier (ID) as described above, and Block S110 collects the unique identifier locally at the mobile computing device; Block S110 can then pass the unique identifier to a remote server (e.g., a domain name system server) to confirm further communications with the wireless beacon and/or to confirm access to additional data related to the wireless beacon. In this implementation, the wireless beacon can broadcast the unique identifier to any device within range such that the unique identifier is publically available to other computing devices within wireless range of the wireless beacon (i.e., public, not private). However, only devices with access to the DNS containing data related to the wireless beacon and the unique identifier can gain access to information specific to the wireless beacon, such as retailer- and/or product-related data (e.g., a retailer name and location, product pricing data), as described below. For example, Block S110 can pass a hashed beacon identifier into the DNS, and the DNS can return a true identity of the wireless beacon to the mobile computing device to confirm user access to the associated beacon data in Block S120.

Block S110 can additionally or alternatively handle wireless communication with one or more wireless beacons over Wi-Fi, cellular, or other radio-frequency communication or via any other suitable type of wireless communication protocol. Block S110 can also handle wireless communication with multiple wireless beacons substantially simultaneously, such as with up to eight discrete wireless beacons within wireless range (e.g., within fifty meters) of the mobile computing device, as described below. However, Block S110 can function any other way to wirelessly receive a unique identifier or other data from the wireless beacon.

5. Authentication

Block S120 of the method recites receiving authorization to communicate with the wireless beacon based on the unique identifier. Generally, communication of locationand/or product-related information to the user through a native application executing on the user's mobile computing device responsive to receipt of a unique identifier from a local wireless beacon is restricted to such information sourced from entities specifically authorized to respond to communications between a computing device and the wireless beacon, such as an owner of the wireless beacon, an operator or the wireless beacon, a lessee of the wireless beacon, or another affiliate of the wireless beacon as specified and recorded by the owner and/or operator of the wireless beacon. Block S120 can therefore function to collect authorization for further communication with the wireless beacon and/or for presentation of information to the user through the mobile computing device responsive to communication with the wireless beacon.

Figure 6:
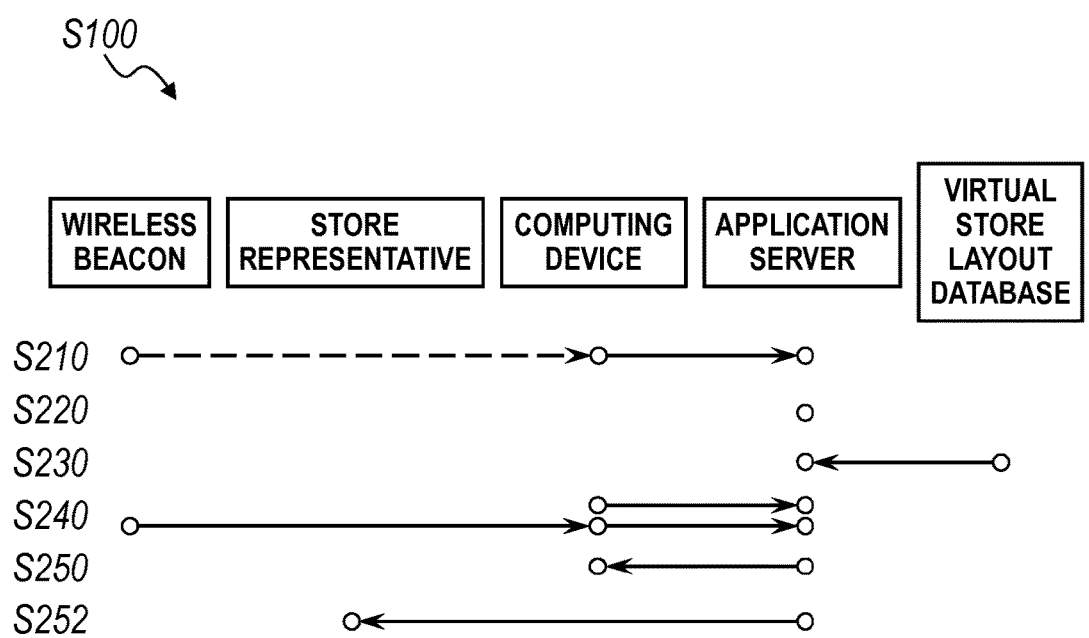
FIG. 6 is a flowchart representation of one variation of the method.

In one implementation, Block S110 uploads the unique identifier received from the wireless beacon and a designator of a native application executing on the computing device to a remote domain name system; the DNS manipulates the unique identifier (e.g., based on the known rule stored on the wireless beacon) to determine an identify (e.g., determine a serial number of) the wireless beacon; and Block S120 receives authorization for communication with the wireless beacon from the DNS based on parity between the designator and an identity of the wireless beacon determined from the unique identifier. Alternatively, Block S110 can upload the unique identifier to an application server hosting the native application executing on the computing device; the application server can implement a DNS or pass the unique identifier and a designator of the application server to a remote DNS for identification of the wireless beacon and determination of parity between the designator and the wireless beacon; and Block S120 can retrieve the result of the parity test to authorize further communication with the wireless beacon, as shown in FIGS. 2, 3, and 6. Block S120 can therefore execute locally on the mobile computing device to receive authorization from a remote entity to communicate with the wireless beacon and/or to present information related to the wireless beacon on the mobile computing device.

In a similar implementation, the application, the DNS, and/or an other remote entity can manipulate the unique identifier collected in Block S110 to retrieve a list one or more native applications granted access to communicate with or on behalf of the wireless beacon; and Block S120 can receive this list and trigger a particular native application installed on the user's mobile computing device to execute in response to a match between the particular native application and a native application prescribed in the list of native applications. However, in this implementation, Block S120 can block further communication with the wireless beacon if no such match is found, or Block S120 can prompt the user to install one or more native applications on the list to enable presentation of location- and/or product-related data to the user via the mobile computing device response to further communication with the wireless beacon.

Furthermore, because the wireless beacon may broadcast public data accessible to various computing devices within its vicinity, the wireless beacon can encrypt various data (e.g., other than the unique identifier) transmitted therefrom, such as accelerometer, gyroscope, and other sensor data transmitted to the mobile computing device during user interaction with the product coupled to the wireless beacon. For example, the wireless beacon can selectively implement one of various encryption models stored locally on the wireless beacon, such as based on a time of day or counter as described above; the application server or DNS can determine the current encryption model in use on the wireless beacon based on the unique identifier, as described above; and Block S120—executing on the mobile computing device—can receive a pointer to the encryption model or a decryption model itself for decrypting data received from the wireless beacon. However, Block S120 can execute locally on the mobile computing device to receive any other form of authorization to communicate with the wireless beacon.

In one variation, Block S120 executes remotely of the mobile computing device, such as on an application server hosting the native application executing on the mobile computing device or remotely on a DNS server in communication with the application server. In this variation, Block S120 can recite transmitting authorization for communication between the wireless beacon and the mobile computing device based on parity between the designator and an identity of the wireless beacon determined from the unique identifier. Generally, in this variation, Block S120 executes remotely from the mobile computing device to identify the wireless beacon from the unique identifier received from the mobile computing device in Block S110. For example, Block S120 can translate the unique identifier into a unique serial number assigned to the wireless beacon. In another example, Block S120 can translate the unique identifier into a pointer to a local or remote file or database specific to the wireless beacon. Alternatively, Block S120 can translate the unique identifier into an identity, serial number pointer, address, etc. of a manufacturing batch number, a deployment group number, an owner, a lessee, and/or a deployment location, etc. of or related to the wireless beacon.

In one implementation, Block S120 can access a rule (or a reverse rule engine) related to that encoded into or stored on the wireless beacon to transform the unique identifier broadcast from the wireless beacon into useful information pertaining to the wireless beacon. For example, substantially all deployed wireless beacons can be encoded with the same rule that outputs a unique identifier based on a serial number, a counter value, and any other static or dynamic variable value stored locally on a wireless beacon. Block S120 can thus resolve the unique identifier by accessing a private copy of the rule (or a reverse rule engine) and applying a received counter value and/or an other variable value to the private copy of the rule to output the identity of the wireless beacon. Similarly, one of a variety of distinct rules can be encoded into each deployed wireless beacon, and Block S120 can test the unique identifier received in Block S110 against a copy of each distinct rule until a valid wireless beacon identity value is output. Yet alternatively, Block S120 can extract a value from the received unique identifier, correlate this value with a particular rule encoded onto the wireless beacon, and apply the (remainder of) the unique identifier to a copy of the particular rule to determine an identity of the wireless beacon (or an identity of the second entity, an identity of an other entity affiliated with the wireless beacon, a location of the wireless beacon, and/or a pointer or address for the wireless beacon, etc.).

However, Block S120 can resolve the unique identifier received in Block S110 into any other useful or relevant data pertaining to the wireless beacon.

6. Mobile Computing Device Location

Block S130 of the method recites identifying a product arranged within the physical space proximal the wireless beacon (such as based on a known location of the wireless beacon within the physical space). Generally, Block S130 functions to estimate a proximity of the mobile computing device to the wireless beacon and/or to various other wireless beacons, computing devices, etc. within the physical location at one or more instances during the user's occupation of the physical space and to correlate the position of the mobile computing device with a particular product within the physical location with which the user may be interacting or reviewing (e.g., for purchase).

In one implementation, Block S130 estimates a physical distance between the mobile computing device and the wireless beacon based on a strength of a wireless signal received from the wireless beacon, such as based on the signal strength of the unique identifier received from the wireless beacon or based on strengths of signals received from the wireless beacon since communication with the wireless beacon was authorized in Blocks 120. Block S130 can thus correlate a strong wireless signal strength with a first distance between the mobile computing device and the wireless beacon and a weak wireless signal strength with a second distance between the mobile computing device and the wireless beacon more than the first distance.

In another implementation, Block S130 transmits a data packet (e.g., a pseudorandom number) to the wireless beacon, subsequently receives a response to the data packet from the wireless beacon (e.g., the same pseudorandom number returned from the wireless beacon), and estimates a distance between the mobile computing device and the wireless beacon based on a total time between sending the data packet and receiving the response (i.e., a 'time of flight'), such as based on a known response latency of the wireless beacon.

In one variation in which the wireless beacon is coupled directly to a product (i.e., rather than being install proximal the product), Block S130 can also estimate an orientation of the mobile computing device relative to the wireless beacon. For example, Block S130 can receive accelerometer and/or gyroscope data from an accelerometer and/or a gyroscope arranged within the wireless beacon, retrieve accelerometer and/or gyroscope data from a corresponding sensor(s) within the mobile computing device, and then compare the accelerometer and/or gyroscope data recorded at the mobile computing device to the accelerometer and/or gyroscope data received from the wireless beacon to estimate an orientation of the mobile computing device relative to the wireless beacon. Block S130 can therefore estimate both a location and an orientation of the mobile computing device relative to the wireless beacon. Block S130 can additionally or alternatively calculate a motion of the wireless beacon—coupled to a product—relative to the user's mobile computing device. Yet alternatively, Block S130 can record these motion data streams from the wireless beacon and/or the mobile computing device, such as locally on the mobile computing device or remotely on the corresponding application server, and Block S130 can manipulate these data to estimate or characterize a user interaction with the product coupled to the wireless beacon.

Figure 5:
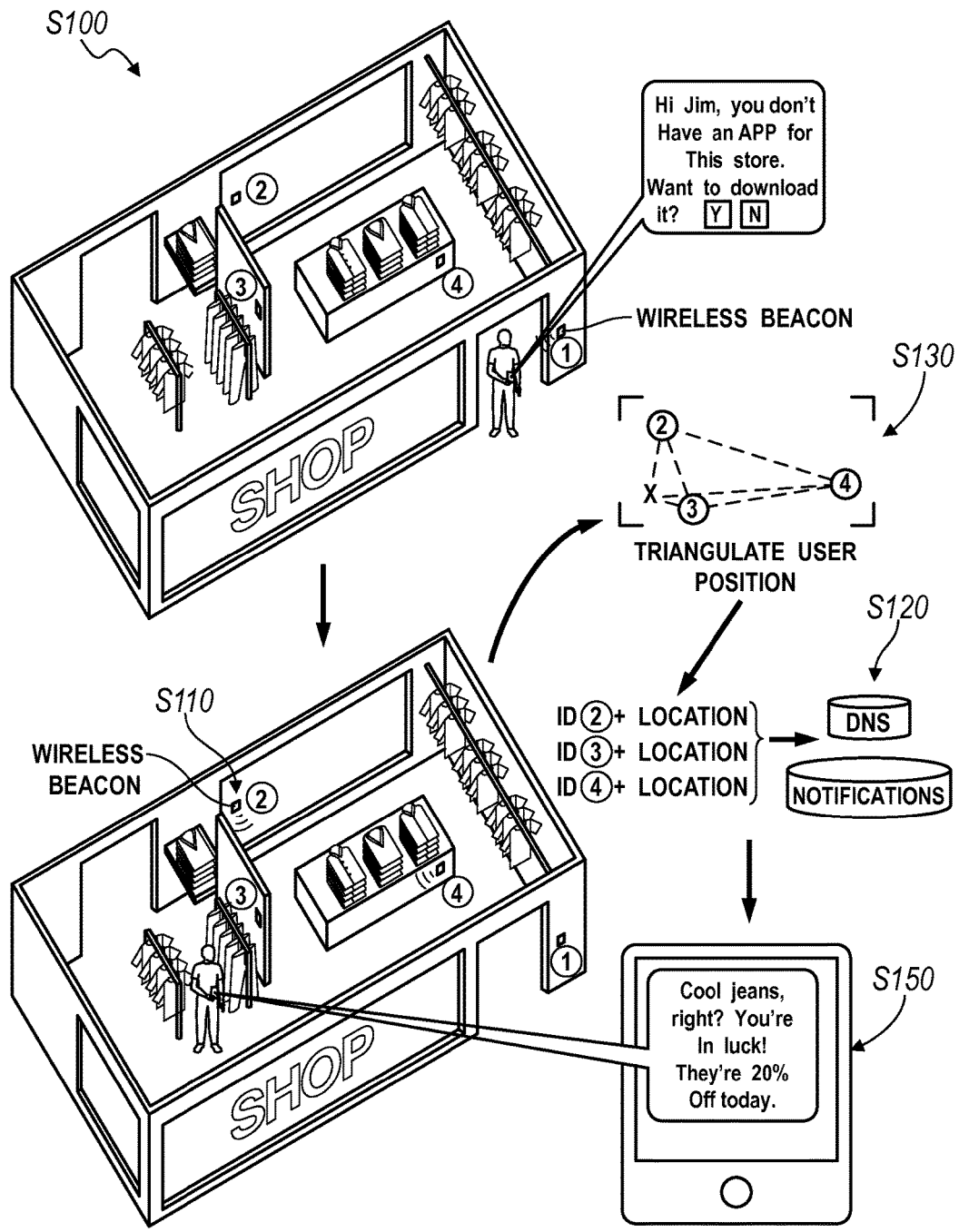
FIG. 5 is a flowchart representation of one variation of the method.

In another implementation, Block S130 interfaces with two or more wireless beacons to determine a position and/or orientation of the mobile computing device relative to the wireless beacons. In this implementation, Block S110 can receive a second unique identifier broadcast wirelessly from a second wireless beacon arranged within the physical space; Block S120 can identify the second wireless beacon based on the second unique identifier, as described above; and Block S130 can estimate a first distance between the wireless beacon and the mobile computing device (as described above), estimate a second distance between the second wireless beacon and the mobile computing device, and triangulate a position of the mobile computing device within the physical space relative to the (first) wireless beacon and the second wireless beacon based on the first estimated distance and the second estimated distance and a known distance between the (first) wireless beacon and the second wireless beacon, as shown in FIGS. 2 and 5. In particular, Block S130 can estimate a distance from the mobile computing device to another object (i.e., a wireless beacon) based on time of flight of data transmitted between the mobile computing device and the wireless beacons, based on signal strength(s), or based on any other suitable method or technique. Block S130 can then access a virtual layout of the (first) wireless beacon, the second wireless beacon, and a group of products arranged within the physical space, such as from a local or remote database, as shown in FIG. 6. The virtual layout can be stored from a previous (e.g., recent) submission by an operator of the physical space, such as entered through an operator-facing interface accessible through a web browser or a native application, and the virtual layout can specify approximate placement of the wireless beacon, the second wireless beacon, physical structures within the physical location (e.g., walls, exhibits), and various products within the physical space. Therefore, Block S130 can apply the estimated distance between the mobile computing device and the wireless beacons and various other data stored within the virtual layout to estimate the position of the mobile computing device within the physical space.

In the foregoing implementation, Block S110 and Block S120 can further cooperate to detect a second mobile computing device arranged within the physical space; and Block S130 can triangulate the position of the (first) mobile computing device (additionally or alternatively) relative to the second mobile computing device. Block S130 can thus discern which of multiple users (e.g., customers) within the physical space is nearest and/or is interacting with a particular product within the physical space based on the location of the mobile computing device relative to one or more other mobile computing devices also in the physical space. Block S130 can thus also cooperate with Block S130 to discern general interest in a particular product based on a proximity of multiple users (i.e., multiple mobile computing devices) simultaneously near the product at various times.

In a similar implementation, Block S130 implements a zoning technique to estimate a position of the user relative to one or more beacons. For example, each beacon within a space can broadcast a signal of a particular limited strength such that signals broadcast from adjacent wireless beacons do not or do not substantially overlap (e.g., such that minimal detectable signal strength boundaries of signals broadcast from adjacent wireless beacons do not substantially overlap). Block S130 can thus predict a location of the user's mobile computing device within the space based on which wireless beacon(s)—in the group of beacons—is within range of the mobile computing device. In this example, signal strengths of the wireless beacons can be set manually by an operator or automatically over time to minimize overlap of signals broadcast from adjacent wireless beacons, such by (manually or automatically) increasing the broadcast signal strength from a first beacon until a second beacon nearby detects the broadcast signal from the first beacon and then reducing signal power by a factor of eight (i.e., $P(r=1)=P(r=2)\times(\frac{1}{2})^3$) for a spherical wireless broadcast volume. In yet another example, wireless beacons within the physical space can broadcast wireless signals of discrete strengths, such as in cycles of 0 dBm, 4 dBm, 0 dBm, 4 dBm, etc., and Block S130 can record actual strengths of signals received from local wireless beacons and manipulate these signal strengths to extrapolate a position of the mobile computing device relative to the wireless beacons within the physical space.

Furthermore, wireless beacons within the physical space can automatically form a mesh network and self-calibrate broadcast signal strengths by estimating distances between beacons within the network. For example, each beacon with a venue can passively listen for or actively request wireless signals (e.g., of substantially equivalent power) from other beacons within range and store a representative value of the strength and associated unique identifier of each signal received therefrom. In this example, Block S130 (or other processor connected to the network of beacons) can then merge these signal strength and beacon identifier data into a map and/or graph of relative distances and relative positions of beacons within the space. Block S130 can then implement the map and/or graph of relative distances and relative positions of beacons to estimate a relative location of a mobile computing device, such as described above.

In the foregoing implementations, Block S130 can also retrieve a compass bearing from a wireless beacon and implement the compass bearing to improve prediction of the location of the mobile computing device relative to the wireless beacon(s) and/or to improve a beacon map for the corresponding space or venue, as described below. Block S130 can additionally or alternatively interface with a compass or other magnetometer sensor integrated within the mobile computing device to determine an absolute orientation (e.g., polar orientation) of the mobile computing device within the physical location. Block S130 can thus distinguish proximity of the mobile computing device to one product within the physical space from proximity of the mobile computing device to another product within the physical space based on the absolute orientation (e.g., the compass direction) of the mobile computing device.

Block S130 can generate a visualization of the determined location and/or orientation of the mobile computing device relative to one or more wireless beacons within the space, such as by displaying such visualization in real-time on a display of the mobile computing device. In one example, each wireless beacon includes a color-coded housing (e.g., one of red, blue, yellow, pink, or green, etc.), is assigned a corresponding color in its local memory, and outputs a wireless signal containing an indicator of the assigned color; Block S130 can thus receive the indicator of the assigned color from the wireless beacon (e.g., once communicate with the wireless beacon is authorized) and then display this color on the display of the mobile computing device. In this example, Block S130 can adjust the opacity of the displayed color based on the estimated distance between the mobile computing device and the wireless beacon, wherein the opacity of the displayed color is substantially proportional to the estimated distance between the mobile computing device and the wireless beacon. Furthermore, in this example, Block S130 can receive indicators of assigned colors of other wireless beacons within wireless range of the mobile computing device, and Block S130 can thus render on the display a composite color of combination or 'blend' of the assigned colors of the wireless beacons within range of the mobile computing device. In this example, the composite color can be a dynamic combination of the wireless beacon housing colors based on an estimated distance between each corresponding wireless beacon and the mobile computing device. Alternatively, in the foregoing example, Block S110 can pass the unique identifier of the wireless beacons to a computer network (e.g., remote server, DNS), Block S120 can retrieve beacon-specific data including the assigned color of the corresponding wireless beacon, and Block S130 can implement the assigned color retrieved in Block S120 to render the position and/or orientation visualization on the mobile computing device relative to one or more beacons in a color-based visualization. However, Block S130 can present mobile computing device position and/or orientation data in a textual format or in any other form or format on the mobile computing device.

Block S130 can therefore estimate the location and/or orientation of a mobile computing device relative to one or more wireless beacons of known location and/or orientation within a space (e.g., a retail setting). Block S130 can also store time-dependent estimated position and/or orientation data of the mobile computing device as the mobile computing device is moved throughout the physical space, such as in a user account of a corresponding user to track the user's movement throughout the space or venue. However, Block S130 can function in any other way to estimate the proximity of the mobile computing device to one or more wireless beacons.

Once the (relative) position of the mobile computing device is determined based on communications with one or more wireless beacons within the physical space, Block S130 can correlate the proximity of the mobile computing device to the wireless beacon with proximity of the mobile computing device to a particular product. In particular, Block S130 can identify a particular product near the user's mobile computing device based on the proximity of the user's mobile computing device to one or more wireless beacons.

In one implementation, Block S130 accesses a map designating beacon and product placement within the space (e.g., the virtual of the space) and applies the estimated location of the mobile computing device (e.g., relative to one or more wireless beacons) to the map to identify a particular product substantially immediately adjacent the user, such as a product with which the user may be interacting at the current time. The virtual map can be manually generated by an operator, manager, or other affiliate of the physical space, such as through an interface accessible through a web browser or through a native application executing on another computing device, as described above. For example, a manager of the space can open the interface and manipulate image-based tools within the interface to specify a perimeter of the space including locations of aisles and shelves, locations and orientations of displayed products, and locations, orientations, and serial numbers of wireless beacons occupying the space. In this example, the interface (or a native application or remote server hosting the interface) can automatically generating a map beacon-specific map of the space by triggering a local computing device to request unique identifiers from local wireless beacons (as in Block S110), passing the unique identifiers to a DNS to identify the wireless beacons (as in Block S120), and triangulating relative positions of the wireless beacons (and the computing device), such as based on signal strengths of the each unique identifier (or subsequent communication) received from the wireless beacons, as described above. In this example, the interface can then verify orientations, locations, and serial numbers of the various wireless beacons noted in the virtual map by automatically applying the beacon map to the manually entered beacon data, and the interface can automatically enter adjustments to noted wireless beacon placements noted in the virtual map based on actual data received from the wireless beacons.

Similarly, once the wireless beacons are installed in the space, the operator can access the interface to trigger automatic population of wireless beacon placement in the virtual map, as described above. In this implementation, once actual arrangement of the wireless beacons within the space is automatically determined empirically, the interface can prompt the operator to populate the virtual map with product data. For example, the operator can manually enter a particular location, a SKU number, a description, inventory data, and/or manufacturer data, etc. of each product or product type (e.g., make and model) arranged within the space (and Block S150 can thus generate notifications to deliver to the user through the user's mobile computing device based on product data contained in the virtual map). Alternatively, the operator can walk through the physical space with a digital (e.g., barcode, RFID) scanner and scan various products arranged within the physical space, the scanner, wireless beacons, and/or other computing device within the space can track the position of the digital scanner with the physical space, such as relative to wireless beacons within the physical space, and the interface (or native application or remote serve hosting the interface) can automatically insert scanned product information into the virtual map. For example, the interface can retrieve product data from a remote database based on product barcodes scanned into the digital scanner, and the interface can place pointers to product-specific data within the virtual map based on a position of the digital scanner (relative to one or more wireless beacons of known position within the physical space) at a time when a corresponding product was scanned.

The interface (or native application, remote server, or other local or remote software) can thus automatically generate the virtual map of contents of the physical space, and the interface can automatically populate the virtual map—or populate the virtual map based on manual entries—with product location, type, name, identifier, SKU number, and/or other data. Block S130 can thus apply the estimated proximity of the mobile computing device to one or more beacons within the space to the virtual map to associate the user with a particular floor area or volume within the space, and Block S130 can then identify a particular product adjacent the user based on an association between the product and the determined floor area or volume specified in the virtual map.

In one implementation, Block S130 correlates the floor area or volume with a nearest product identified in the wireless beacon-product map. For example, Block S130 can thus distinguish a particular product—from one or more other products arranged within the space—as currently relevant to the user (e.g., adjacent the user, in front of the user, currently held by the user, etc.) based on the position of the mobile computing device within the physical space relative to one or more wireless beacons of known location within the physical space and known position relative to the particular product, as noted in the virtual map, as shown in FIG. 1. Block S130 can thus select a particular product nearest the user, a particular product nearest the user within 120° of the user's front, etc. Block S130 can thus trigger Block S130 to estimate the user's level of interest in this product.

In another implementation, Block S130 retrieves user information to score a possibility of user interaction with each of multiple products associated with the floor area or volume within the space. For example, Block S130 can access a demographic or other data of the user (e.g., age, gender, occupation, income, education level, hobby, marital status, birthday, music interest, etc.) from a social networking profile of the user linked to the native shopping application executing on the user's mobile computing device or stored in the native shopping application as a user profile. In this example, Block S130 can thus assign an interest score of products near the user's mobile computing device based on a perceived user interest(s) extrapolated from on one or more user demographics (or other user data). Block S130 can then identify a particular product of a highest rank (or score) amongst the set of products near the user and select this particular product as of particular current interest to the user. Block S130 can thus trigger Block S140 to estimate the user's level of interest in this particular product.

In another implementation, Block S130 retrieves additional data from one or more sensors within the user's mobile computing device to correlate the user's current floor area or volume in the space with a particular product. For example, Block S130 an retrieve a compass bearing from a compass sensor within the user's mobile computing device, predict the orientation of the user based on the compass bearing of the mobile computing device, and filter products within the space and near the user's floor area or space based on the predicted orientation of the user. In this example, Block S130 can thus select a particular product—from a set of products associated with, near, or within the user's current floor space or volume within the space—based on a direction of attention of the user (e.g., the front of the user) extrapolated from a compass bearing of the user's mobile computing device. In another example, Block S130 can access accelerometer, gyroscope, and/or altitude data of the user's mobile computing device to determine if the user has retrieved a product from a shelf of a particular height or interacted with a product of a particular size, and Block S130 can thus select a particular product—from a set of products associated with, near, or within the user's current floor space or volume within the space—based on a perceived product interaction height of the user and corresponding vertical positions of products or product features within the space.

In yet another implementation, Block S130 accesses previous user-product interaction data and/or previous user purchase data to predict subsequent (i.e., current) user interaction with a particular product within the space. For example, Block S130 can access stored user data from a previous user visit to the physical venue or browsing history on a website or within a native application associated with the venue or exhibiting details related to a product manufactured, distributed, and/or advertised by the venue, as shown in FIG. 1.

However, Block S130 can implement any one or more such methods and/or apply any other suitable user, sensor, product, space, or other data to correlate the proximity of the mobile computing device to the wireless beacon with a particular product within the space.

8. Block S140

Block S140 of the method recites projecting a level of interest in the product by a user affiliated with the mobile computing device based on communication between the mobile computing device and the wireless beacon during a period of time. Generally, Block S140 functions to ascertain an interest of the user in the product, which can then be manipulated to estimate a likelihood of purchase of a unit of the product by the user.

In one implementation, Block S120 wirelessly pairs the mobile computing device (or triggers or authorizes the mobile computing device to wirelessly pair) with the wireless beacon; and Block S140 projects the level of the user's interest in the product based on a duration of time that the mobile computing device is wirelessly paired to the wireless beacon. For example, Block S140 can correlate an amount of time that the user spends near the particular product with a level of user interest in the product. In this example, Block S140 can cyclically broadcast beacon requests from the mobile computing device during a period of time (e.g., while the user's mobile computing device occupies the physical location/space); receive a series of unique identifiers from a group of wireless beacons proximal the mobile computing device responsive to the wireless beacon requests; identify wireless beacons in the group of wireless beacons based on the unique identifiers (e.g., by passing the unique identifiers to a remote DNS server); and then project a level of interest in the product by the user based on a number of unique identifiers received from a particular wireless beacon—corresponding to the product (as defined in the virtual map)—during the period of time.

Block S140 can also collect additional data from one or more local wireless beacons and/or from the mobile computing device, characterize a user interaction with the product based on these data, and estimate the user's interest in the product (further) based on this interaction. In one implementation, Block S140 can collect time-dependent motion (e.g., accelerometer and/or gyroscope data) from corresponding sensors within the mobile computing device (e.g., an accelerometer and/or a gyroscope) as the user moves toward a beacon and/or through a particular floor area or volume in the space associated with a particular product. From this data, Block S140 can estimate an interest in a product associated with the floor area or volume based on how quickly the user moves through the floor area or volume and/or if and for how long the user stops in the floor area or volume corresponding to the particular product. For example, Block S140 can estimate low user interest in a product arranged within a particular floor area if the user does not slow while moving through the particular floor area, can estimate moderate interest in a product arranged within a particular floor area if the user slows while moving through the particular floor area, and can estimate high interest in a product arranged within the particular floor area if the user stops in the particular floor area for at least a threshold period of time (e.g., eight seconds). Similarly, Block S140 can assign a quantitative or qualitative measure of user interest to a product arranged within a particular floor area based on how low the user moves while occupying the particular floor area, such as by estimating low interest in the product if the user stops for less than eight seconds in the floor area, estimating moderate interest in the product if the user stops for eight to thirty seconds in the floor area, and estimating high interest in the product if the user stops for more than thirty seconds in the floor area. However, Block S140 can implement any other suitable time-related thresholds to estimate user interest in a product arranged within a particular floor area or volume of the physical space.

In one variation, the wireless beacon: is arranged on, connected to, or otherwise coupled to the product; includes an accelerometer that detects accelerations of the wireless beacon along one or more axes; and broadcasts a value of a detected acceleration, such as in response to a change in the detected acceleration of the product (greater than a threshold acceleration), according to a broadcast cycle rate (e.g., 2 Hz), or in response to receiving a request from a local computing device, as described above. In this variation, Block S140 can further collect acceleration data output from the wireless beacon during a period of time during which the mobile computing device is within wireless range of the wireless beacon. Alternatively, once the product is identified in Block S130, Block S130 can trigger the mobile computing device to pair with the particular wireless beacon arranged on or otherwise coupled to the product, and Block S140 can download motion data from the wireless beacon while the mobile computing device and the wireless beacon are coupled. In this implementation, Block S130 can also terminate communication (e.g., wireless pairing) between the mobile computing device and the wireless beacon once the product is determined to no longer be relevant to and/or substantially adjacent the user (e.g., once a unique identifier is received from a second wireless beacon corresponding to an alternative product within the physical space). Block S140 can similarly collect rotation (e.g., gyroscope) data, orientation (e.g., compass), temperature, and/or other data from the wireless beacon, such as substantially in real-time.

In this variation, Block S140 can then extrapolate or characterize an interaction between the user and the product based on the acceleration data (and/or other data) received from the corresponding wireless beacon, and Block S140 can estimate the level of interest in the product by the user based on a type of the interaction and/or a duration of the interaction, as shown in FIG. 2. For example, Block S140 can determine that the user has stopped in a particular floor area associated with a particular product and then correlate acceleration data while the user stands in the floor area with handling of a particular product associated with the floor area. In this example, Block S140 can thus correlate a length of time during which the user handles the particular product (as indicated by detected changes in acceleration of the wireless beacon) with a level of user interest in the product.

In the foregoing variation, Block S140 can further trigger Block S150 to deliver data related to the product—to and/or through the user's mobile computing device—once a certain type and/or magnitude of motion (e.g., acceleration) is detected at the wireless beacon. For example, for the wireless beacon that is arranged on or otherwise connected or coupled to the product, Block S140 can correlate an initial magnitude of acceleration—from a resting state—received from the wireless beacon with a level of excitement of the user in discovering the product in the physical space, and Block S140 can then trigger Block S150 to render product-related data on a display of the mobile computing device in response to receipt of an acceleration—received from the wireless beacon—of magnitude that exceeds a threshold acceleration magnitude. Block S140 can thus execute locally on the user's mobile computing device to estimate or predict the user's level of interest in the product based on additional data received from the wireless beacon.

Block S140 can also predict a type or level of user interest in the product based on user Internet browsing history, user demographic, and/or other user data. For example, Block S140 can retrieve user data—such as stored locally in memory on the mobile computing device or remotely in a remote database—to determine that the user is an unmarried male in his mid-20s. In this example, Block S140 can implement these user demographic data to correlate a detected user interaction with a stuffed animal on display in a retail location with mocking amusement of the stuffed animal rather than user interest in purchasing the stuffed animal. In this example, Block S140 can associate the same user's interaction with a digital single-lens reflex (DSLR) camera with authentic interest by the user in purchasing the DSLR. However, Block S140 can function in any other way and apply any other data to collect and analyze sensor data from the user's mobile computing device.

Block S140 can therefore execute locally on the user's mobile computing device—such as within a native application running on the user's mobile computing device—to quantify and/or qualify user interest in the product based on the user's interaction(s) with the product. Alternatively, Block S140 can be implemented remotely from the mobile computing device, such as on a remote server in contact with the mobile computing device. For example, an application server can receive unique identifiers and acceleration data transmitted from the wireless beacon and collected by the native application executing on the mobile computing device, and the application server can execute Block S140 to extrapolate an interaction between the user and the product from the acceleration data and estimate the level of interest in the product by the user based on a type of the interaction and/or a duration of the interaction, as described above. Block S140 can also execute substantially in real-time as data (e.g., motion data) is collected at the mobile computing device and/or at the wireless beacon. Alternatively, Block S140 can execute asynchronously, such as by analyzing stored user and/or wireless beacon data once the user leaves the physical space (e.g., a retail location).

Blocks S110, S130, S130, and S140 can further cooperate to track user motion through the space over time (e.g., during the user's visit to a showroom) and to correlate interactions and proximities of the user to various products therein with user interest in the various products. Block S140 can further rank or score estimated user interests—that is, user interest in purchasing units of—the various products. In particular, Block S140 can assign a highest score to a product corresponding to a greatest perceived interest by the user (e.g., a product exhibiting a greatest likelihood of purchase by the user), such as based on a combination of a determined level of interest and a demographic of the user (e.g., an income level), and Block S140 can assign lower scores to products exhibiting lower likelihoods of purchase by the user.

9. Block S150

Block S150 of the method recites, in response to the level of interest in the product exceeding a threshold value, presenting, on the mobile computing device, a product ordering option for ordering a unit of the product. Block S150 can alternatively recite, in response to the level of interest in the product exceeding a threshold value, transmitting product data corresponding to the product to the mobile computing device for presentation to the user. Generally, Block S150 functions to share product-related details with the user through the user's mobile computing device based on a user interaction with the product, a perceived user interest in the product, and/or a predicted likelihood of product purchase by the user.

In one implementation, Block S150 executes locally on the mobile computing device to render product-related data on a display of the mobile computing device, such as in real-time as the user is engaging (e.g., interacting with, reviewing) the product or asynchronously when the user moves away from the product and/or leaves the retail or showroom location. Block S150 can automatically generate a notification, page, or other type of communication containing information related to product, such as by accessing product data stored locally on the mobile computing device or retrieved from a remote database, such as a remote database maintained by or on behalf of the retail location, storefront, showroom, and/or manufacture or supplied of the product. Alternatively, Block S150 can download the communication (e.g., notification, product page, product hyperlink, etc.) from a remote database, such as from the application server, and then render a form of the communication on the display of the mobile computing device in real-time or asynchronously, as described above.

In one implementation, Block S150 presents (i.e., renders visually on the mobile computing device) a virtual product ordering interface for ordering a unit of the product. For example, the user can access the virtual product ordering interface, such as from within a popup notification presented on the display of the mobile computing device or from within the native application or within a web browser executing on the mobile computing device, and the user can submit an order for a unit of the product through the virtual product ordering interface. In this example, the user can enter a shipping address and billing information into the virtual product ordering interface, and a remote inventory location (distinct from the storeroom location) can ship a unit of the product to the user's shipping address accordingly. Block S150 can additionally or alternatively download product data from a remote database (e.g., the application server, a database maintained by the retail location, a database maintained by a manufacturer or supplier of the product, etc.), and Block S150 can render these data—in conjunction with or independently of a product ordering option—on the user's mobile computing device, such as within a notification presented on the display of the mobile computing device.

Alternatively, Block S150 can execute remotely from the mobile computing device to select or generate a product-related communication for delivery to the user via the user's mobile computing device. Block S150 can transmit the product-related notification to the mobile computing device in real-time, such as once the user has remained in a position near the product (within the floor area or volume of the space corresponding to the product) for at least a threshold period of time, when determined user interest in the product reaches a threshold interest, or when a product interest rank (determined in Block S140 as described above) surpasses a threshold product rank or surpasses other ranked products within the space.

Block S150 can alternatively transmit the notification to the mobile computing device asynchronously. For example, Block S150 can transmit a notification—specific to a product with a greatest user interest rank of all products within a retail location—to the user's mobile computing device in response to detection of the user's exit from the retail location, such as once the user walks beyond a perimeter boundary of the retail location property, once the user walks out of the front door of the retail location, once the user arrives home, etc. In this implementation, Block S150 can interface with a GPS sensor within the mobile computing device to determine the user's location and access geofencing data to trigger delivery of the notification. Alternatively, Block S110, S120, and S130 to determine that the user has walked passed a wireless beacon arranged at an exit of the retail location, and Block S150 can transmit a notification related to one or more products within the retail location responsive to the user's exit from the retail location.

In one implementation, Block S150 generates and/or presents the notification that includes a (link to a) product page corresponding to the particular product within a online retailer website accessed through a web browser executing on the mobile computing device. Block S150 can similarly present the notification through a general shopping or retailer-specific native application executing on the mobile computing device by opening a product page corresponding to the particular product. Block S150 can alternatively present a list of online retailers through which to purchase the product, such as with the list of online retailers ranked by cost (with tax and/or shipping costs) of the particular product, and then link the user to particular website or native application corresponding to an online retailer selected from the list by the user, as shown in FIG. 1. The product-related notification can therefore include a product description, a product image, a product price, a product review, an inventory status, a ship and/or delivery time, a shipping cost, customization options or a list of customizable features, alternative suppliers, alternative products, and/or any other relevant product-related information, as shown in FIG. 2. Block S150 can additionally or alternatively generate an SMS text message, email, social networking message, or other communication including a link to a product page of the particular product and transmit this communication to another individual or computing device selected by the user.

Block S150 can also present additional notifications of other products to the user through the mobile computing device. For example, Block S150 can present notifications of corresponding products according to the product scores output in Block S140, such as with a notification of a highest-scored product presented first followed by notifications of lower-scored products. Block S150 can enable the user to scroll or swipe through the notifications sequentially, or Block S150 can deliver a notification of lower-scored products as a user ignores or closes previous notification pertaining to a high-scored product. Alternatively, Block S150 an present a single notification containing a list of products, such as a list of products assigned scores exceeding a common threshold score across all users or exceeding a threshold score specific to the user.

Block S150 can similarly queue multiple notifications for delivery to the user through the user's mobile computing device, wherein each notification corresponds to a different product within the physical space. In this implementation, Block S150 can order a queue of notifications to be presented to the user when the user leaves a retail location, each notification in the queue corresponding to a different product exhibited in the retail location and ordered in the queue according to a rank of projected user interest in the corresponding product. Thus, once the user exits the store, a series of notifications for products of sequentially less perceived interest to the user can be presented on the user's mobile computing device, such as a total of five notifications corresponding to the top five products of perceived interest to the user, until the user submits an order for a unit of product through the mobile computing device, or until the user submits a request for additional product information through the mobile computing device. For example, the method can further include: receiving a second unique identifier broadcast wirelessly from a second wireless beacon arranged within the physical space; identifying the second wireless beacon based on the second unique identifier; identifying a second product arranged within the physical space proximal the second wireless beacon; and projecting a second level of interest in the second product by the user based on communication between the mobile computing device and the second wireless beacon within the period of time. In this variation, Block S150 can further include prioritizing presentation of the product ordering option for a unit of the product on the mobile computing device over presentation of a product ordering option for a unit of the second product on the mobile computing device based on the level of interest in the product exceeding the second level of interest in the second product. However, Block S150 can deliver a product-related notification to the user's mobile computing device according to any other timing, event, or trigger.

Block S150 can further enable the user to order and pay for the particular product through the corresponding notification or guide the user to an electronic ordering venue for the product through the corresponding notification, as shown in FIG. 2. For example, Block S150 can store user payment information (e.g., a credit card number) and a shipping address and then submit the payment information and shipping address to a supply in response to confirmation of a product order by the user through the notification. Once the user submits a purchase for the product, Block S150 can also apply a revenue share model to the transaction by distributing a portion of the payment to the storefront and a portion of the funds to the product inventory entity. However, Block S150 can function in any other way to present a purchase option for a product to the user and can support or enable purchase of the product by the user in any other suitable way through the mobile computing device.

Block S150 can further set a threshold value for triggering presentation of additional product-related data to the user. For example, Block S150 can customize the threshold value for delivering product data to the user based on a product purchase history of the user. In this example, Block S150 can access user purchase records and corresponding projected user interest levels for the products previously purchased by the user, extrapolate a relationship between purchase of a product and projected user interest level, user-product interaction type, and/or user-product interaction duration, etc. for products previously purchased by the user. From this relationship, Block S150 can set a threshold level of perceived interest for triggering delivery of additional product-related data to the user and/or presenting an interface for ordering a unit of a product on the user's mobile computing device. Block S150 can additionally or alternatively manipulate this extrapolated relationship between purchases by the user and projected user interest levels to customize a model for transforming user interactions with a product (e.g., duration of proximity of the user to the product, type of motion of the user's mobile computing device, type of motion of the product, etc.) into a level of user interest in the product, such as shown in FIG. 3; Block S150 can thus pass this model to Block 140 to project a level of user interest in the product (e.g., a likelihood of purchase of a unit a product by the user.

10. Representative

As shown in FIG. 6, one variation of the method further includes Block S152, which recites transmitting a prompt to a representative of the physical space in response to the level of interest in the product exceeding the threshold value, the prompt specifying the location of the user within the physical space and the product. Generally, Block S152 can function to deliver a prompt to a representative of the physical space provide assistance to the user.

In one implementation, Block S140 can manipulate user and/or wireless beacon data to discern general interest in a product from interest in purchasing a unit of the product, and Block S152 can prompt a representative of the physical space to assist the user in learning more about and purchasing a unit of the product. For example, for a group of wireless beacons deployed in an automotive showroom, Blocks S110, S120, and S130 can cooperate to detect the user's proximity to a particular vehicle, and Block S140 can characterize the user's proximity to the vehicle and how the user walks around and enters the vehicle with either a general interest in the model or a particular interest in purchasing the vehicle; Block S152 can thus transmit a prompt to assist the user—such as with a current location, identity, etc. of the user—to a computing device of a representative of the automotive showroom. As in this example, the method can implement machine learning techniques to extrapolate patterns in past user-product interactions that correspond to purchases of vehicles; Block S152 can thus compare the user's product interactions to these patterns to discern a real level of interest in purchasing a unit of the product.

Block S152 can thus transmit a prompt, such as in the from of a popup notification, to a computing device associated with a representative of the physical space and/or the product adjacent the user (i.e., the product with which the user is currently engaged). However, Block S152 can function in any other way to communicate a need of a potential customer occupying a physical space to a representative of the physical space.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for distributing notifications to a mobile computing device, comprising:
   at a wireless beacon statically mounted to a physical space, the wireless beacon comprising a wireless communication module with a limited broadcasting range, a battery electrically coupled to the wireless communication module, and a housing enclosing the battery and the wireless communication module, wirelessly broadcasting a unique identifier of the wireless beacon, comprising:
      providing power from the battery to the wireless communication module; and
      at the wireless communication module, transmitting the unique identifier;
   in response to the mobile computing device entering the limited broadcasting range, at the mobile computing device, receiving the unique identifier from the wireless beacon, wherein the mobile computing device is executing a native application;
   at the mobile computing device, transmitting the unique identifier and a designator of the native application executing on the mobile computing device to a remote domain name system;
   at the remote domain name system, determining an identity of the wireless beacon based on the unique identifier;
   at the remote domain name system, determining whether the designator is associated with the identity of the wireless beacon, based on a list of authorized native applications for the wireless beacon;
   when the designator is not associated with the identity of the wireless beacon, at the remote domain name system:
      transmitting a prompt to the mobile computing device to install one or more native applications having an authorized native application designator;
   when the designator is associated with the identity of the wireless beacon:
      at the mobile computing device, receiving authorization from the remote domain name system to communicate with the wireless beacon;
      at the remote domain name system, identifying a product based on the unique identifier, wherein the product is arranged within the physical space proximal the wireless beacon;
      at the remote domain name system, projecting a level of interest in the product by a user affiliated with the mobile computing device based on communication between the mobile computing device and the wireless beacon during a period of time; and
      in response to the level of interest in the product exceeding a threshold value, presenting, within the native application executing on the mobile computing device, a product ordering option for ordering a unit of the product.

2. The method of claim 1, wherein receiving the unique identifier comprises, at the mobile computing device, wirelessly receiving the unique identifier from the wireless beacon; and wherein presenting the product ordering option for the unit of the product comprises rendering, on a display of the mobile computing device, a virtual product ordering interface for ordering the unit of the product from a remote inventory location distinct from the physical space.

3. The method of claim 2, wherein presenting the product ordering option for the unit of the product comprises queuing a notification for the product on the mobile computing device, detecting a proximity of the mobile computing device to an exit of a storeroom location, and presenting the notification on a display of the mobile computing device in response to departure of the mobile computing device from the storeroom location.

4. The method of claim 1, further comprising:
   receiving a second unique identifier of a second wireless beacon arranged within the physical space, the second unique identifier broadcast wirelessly from the second wireless beacon;
   identifying the second wireless beacon based on the second unique identifier;
   identifying a second product arranged within the physical space proximal the second wireless beacon; and
   projecting a second level of interest in the second product by the user based on communication between the mobile computing device and the second wireless beacon within the period of time;
   wherein presenting the product ordering option for the unit of the product on the mobile computing device comprises prioritizing presentation of the product ordering option for the unit of the product on the mobile computing device over presentation of a product ordering option for a unit of the second product on the mobile computing device based on the level of interest in the product exceeding the second level of interest in the second product.

5. The method of claim 1, wherein receiving the unique identifier comprises receiving a transmission from the wireless beacon, the transmission comprising the unique identifier; the method further comprising receiving a second transmission comprising a second unique identifier of a second wireless beacon arranged within the physical space, the second transmission broadcast wirelessly from the second wireless beacon; and identifying the second wireless beacon based on the second unique identifier; wherein identifying the product arranged within the physical space comprises estimating a first distance between the wireless beacon and the mobile computing device based on the transmission, estimating a second distance between the second wireless beacon and the mobile computing device based on the second transmission, determining a position of the mobile computing device within the physical space relative to the wireless beacon and the second wireless beacon based on the first estimated distance and the second estimated distance, and distinguishing the product from a group of products arranged within the physical space based on the position of the mobile computing device.

6. The method of claim 5, further comprising detecting a second mobile computing device arranged within the physical space; wherein determining the position of the mobile computing device within the physical space comprises trilaterating the position of the mobile computing device within the physical space further relative to the second mobile computing device.

7. The method of claim 5, wherein distinguishing the product from the group of products arranged within the physical space comprises accessing a virtual layout of the wireless beacon, the second wireless beacon, the group of products, and the product within the physical space and selecting the product based on the position of the mobile computing device within the physical space relative to the wireless beacon and the second wireless beacon.

8. The method of claim 7, wherein accessing the virtual layout comprises retrieving the virtual layout from a remote database, the virtual layout submitted by an operator of the physical space and specifying placement of the wireless beacon, the second wireless beacon, the group of products, and the product within the physical space.

9. The method of claim 1, further comprising wirelessly pairing the mobile computing device to the wireless beacon; wherein projecting the level of interest in the product by the user comprises projecting the level of interest in the product based on a duration of time that the mobile computing device is wirelessly paired to the wireless beacon.

10. The method of claim 1, wherein projecting the level of interest in the product by the user comprises cyclically broadcasting beacon requests from the mobile computing device during the period of time, receiving unique identifiers broadcast from a group of wireless beacons proximal the mobile computing device responsive to the beacon requests, identifying wireless beacons in the group of wireless beacons based on the unique identifiers, and projecting the level of interest in the product by the user based on a number of unique identifiers received from the wireless beacon during the period of time.

11. The method of claim 1, further comprising:
at a second wireless beacon arranged on the product, the second wireless beacon comprising an accelerometer; a second wireless communication module; a second battery electrically coupled to the second wireless communication module; and a second housing enclosing the accelerometer, the second battery, and the second wireless communication module:
at the accelerometer, during the period of time, sampling acceleration data; and
at the second wireless communication module, wirelessly transmitting the acceleration data and a second unique identifier of the second wireless beacon;
at the mobile computing device:
receiving the second unique identifier and the acceleration data from the second wireless beacon; and
transmitting the second unique identifier and the acceleration data to the remote domain name system;
at the remote domain name system, determining an interaction between the user and the product from the acceleration data;
wherein projecting the level of interest in the product by the user comprises estimating the level of interest in the product by the user using a pattern-matching technique based on a type of the interaction and a duration of the interaction.

12. The method of claim 11, wherein presenting the product ordering option for ordering the unit of the product comprises rendering product data related to the product on a display of the mobile computing device in response to receipt of an acceleration value, in the acceleration data received from the wireless beacon, that exceeds the threshold value.

13. The method of claim 11, further comprising downloading the product data related to the product from a remote database, wherein rendering the information on the display of the mobile computing device comprises rendering the information and the product ordering option within a notification on the display of the mobile computing device.

14. The method of claim 1, further comprising estimating a location of the user within the physical space based on a location of the wireless beacon within the physical space and transmitting a prompt to a representative of the physical space in response to the level of interest in the product exceeding the threshold value, the prompt to the representative specifying the location of the user within the physical space and the product.

15. The method of claim 1, wherein identifying the product arranged within the physical space comprises receiving a compass direction of the mobile computing device and distinguishing a proximity of the mobile computing device to the product from a proximity of the mobile computing device to a second product within the physical space based on the compass direction of the mobile computing device.

16. A method for distributing notifications to a mobile computing device, comprising:
at a wireless beacon statically coupled at a known location to a physical space, the wireless beacon comprising a Bluetooth communication module with a limited broadcasting range, a battery electrically coupled to the Bluetooth communication module, and a housing enclosing the battery and the Bluetooth communication module: wirelessly broadcasting a unique identifier of the wireless beacon, comprising:
providing power from the battery to the Bluetooth communication module; and
at the Bluetooth communication module, transmitting the unique identifier;
in response to the mobile computing device entering the broadcasting range, at the mobile computing device, receiving the unique identifier from the wireless beacon wherein the mobile computing device is executing a native application;

at the mobile computing device, transmitting the unique identifier and a designator of the native application executing on the computing device to a remote domain name system;

at the remote domain name system, determining an identity of the wireless beacon based on the unique identifier;

at the remote domain name system, determining whether the designator is associated with the identity of the wireless beacon;

when the designator is not associated with the identity of the wireless beacon, at the remote domain name system:

transmitting a prompt to the mobile computing device to install one or more native applications having an authorized native application designator;

when the designator is associated with the identity of the wireless beacon:

at the mobile computing device, receiving authorization from the remote domain name system to communicate with the wireless beacon;

determining a location of the mobile computing device based on a known location of the wireless beacon within the physical space;

identifying a product arranged within the physical space based on the location of the mobile computing device, wherein the product is arranged proximal the mobile computing device; and projecting a level of interest in the product by a user affiliated with the mobile computing device based on communication between the mobile computing device and the wireless beacon during a period of time; and in response to the level of interest in the product exceeding a threshold value, transmitting product data corresponding to the product from the remote domain name system to the mobile computing device for presentation to the user within the native application.

17. The method of claim 16, further comprising:

at a second wireless beacon arranged on the product, the second wireless beacon comprising an accelerometer; a second wireless communication module; a second battery electrically coupled to the second wireless communication module; and a second housing enclosing the accelerometer, the second battery, and the second wireless communication module:

at the accelerometer, during the period of time, sampling acceleration data; and at the second wireless communication module, wirelessly transmitting the acceleration data and a second unique identifier of the second wireless beacon; "at the mobile computing device:

receiving the second unique identifier and the acceleration data from the second wireless beacon; and transmitting the second unique identifier and the acceleration data to the remote domain system;

at the remote domain system, determining an interaction between the user and the product from the acceleration data; wherein projecting the level of interest in the product by the user comprises estimating the level of interest in the product by the user using a pattern-matching technique based on a type of the interaction and a duration of the interaction.

18. The method of claim 16, wherein transmitting product data corresponding to the product to the mobile computing device comprises transmitting, to the mobile computing device, a notification comprising a product ordering option for ordering the unit of the product substantially in real-time in response to the level of interest in the product exceeding the threshold value.

19. The method of claim 16, wherein transmitting product data corresponding to the product to the mobile computing device comprises setting the threshold value based on a product purchase history of the user and a projected level of interest in a product handled by the user.

20. The method of claim 16, wherein determining whether the designator is associated with the identity of the wireless beacon comprises performing a parity test to determine a parity between the designator and the identity of the wireless beacon.

\* \* \* \* \*

UNITED STATES PATENT AND TRADEMARK OFFICE
CERTIFICATE OF CORRECTION

PATENT NO. : 10,244,348 B2
APPLICATION NO. : 14/463597
DATED : March 26, 2019
INVENTOR(S) : Kostka et al.

It is certified that error appears in the above-identified patent and that said Letters Patent is hereby corrected as shown below:

In the Claims

Column 26, Line 10, Claim 17, after "beacon;", insert --¶--
Column 26, Line 10, Claim 17, delete ""at" and insert --at-- therefor
Column 26, Line 18, Claim 17, after "data;", insert --¶--

Signed and Sealed this
Thirty-first Day of December, 2019

Andrei Iancu
*Director of the United States Patent and Trademark Office*